Oct. 1, 1968  D. J. WHEELER ET AL  3,403,833
STRIP CLAMP ASSEMBLY
Filed April 8, 1966  2 Sheets-Sheet 2

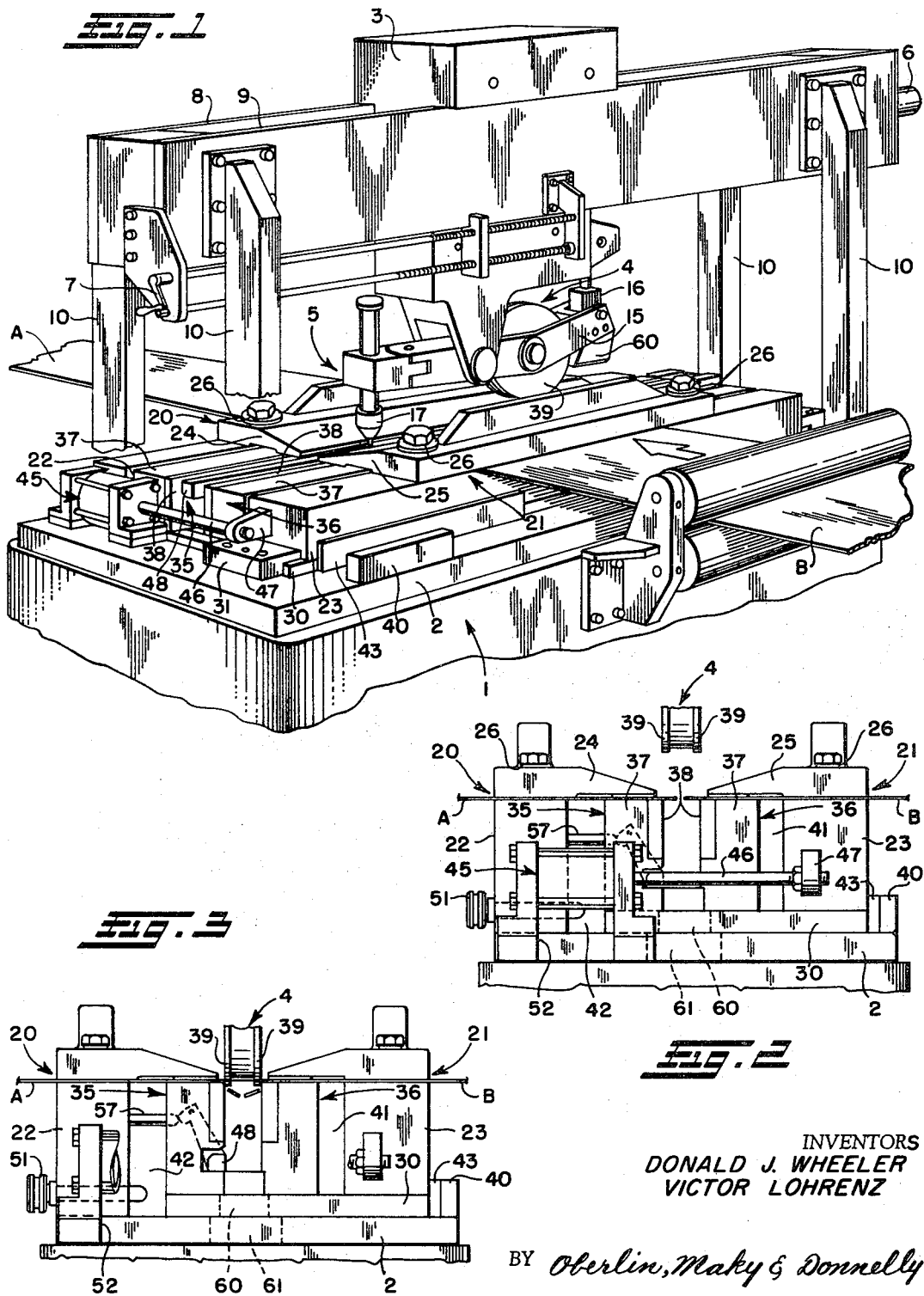

INVENTORS
DONALD J. WHEELER
VICTOR LOHRENZ

BY Oberlin, Maky & Donnelly
ATTORNEYS

United States Patent Office 3,403,833
Patented Oct. 1, 1968

3,403,833
STRIP CLAMP ASSEMBLY
Donald J. Wheeler, Kent, and Victor Lohrenz, Bedford, Ohio, assignors to Guild Metal Joining Equipment Co., Bedford, Ohio, a corporation of Ohio
Filed Apr. 8, 1966, Ser. No. 541,366
13 Claims. (Cl. 228—13)

ABSTRACT OF THE DISCLOSURE

A strip clamp assembly including a pair of spaced apart strip clamps, one being fixed and the other mounted for limited movement toward and away from the fixed strip clamp, and a pair of shear block assemblies between the strip clamps having a fixed spacing therebetween, said pair of shear block assemblies also being mounted for movement toward and away from the fixed strip clamp to expose the trimmed ends of a pair of strips clamped by the strip clamps after shearing and establish a predetermined spacing therebetween.

---

The present invention relates generally, as indicated, to a strip clamp assembly and, more particularly, to a strip clamp assembly including a unique gap control mechanism for accurately locating the ends of a pair of strips with respect to each other prior to joining.

As is well known in the art, the gap between the ends of metal, plastic, or other coated metal strips and sheets must be accurately controlled if a high quality weld joint is to be established therebetween. Moreover, for different metal thicknesses and types of metals the gap must be varied to obtain a high quality weld of sufficient penetration through the inner faces of the strip ends.

An example of a very effective gap control mechanism for accurately spacing and positioning the ends of metal strips to be joined may be found in the patent to Leon L. Schaffer and Donald J. Wheeler, Patent No. 3,239,909, granted Mar. 15, 1966. However, there is a need for a much more simplified and less expensive gap control mechanism for precisely determining the gap between strip ends, which is a principal object of the present invention.

Another object is to provide such a gap control mechanism in combination with a strip clamp assembly for continuously gripping the strips both during the shearing and joining operations to eliminate any possibility of strip misalignment after shearing.

Still another object is to provide a strip clamp assembly and gap control mechanism of the type indicated including a pair of strip clamps, one of which is adapted to be indexed with respect to a pair of lower shear block assemblies toward the other strip clamp and also indexed further toward such other strip clamp together with such lower shear block assemblies subsequent to shearing for properly locating the strip ends for welding.

Another object is to provide such a strip clamp assembly and gap control mechanism including an adjustable stop screw for accurately controlling the amount of indexing of such one strip clamp and lower shear block assemblies toward the other strip clamp to establish the desired gap between the strip ends for welding.

A further object is to provide such a strip clamp assembly and gap control mechanism with a pivotally mounted backup bar and novel cam means for pivoting such backup bar into strip supporting position during indexing of such one strip clamp and lower shear block assemblies toward the other strip clamp as aforesaid.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

In such annexed drawing:

FIG. 1 is an isometric view, partially broken away, of a preferred form of strip clamp assembly and gap control mechanism in accordance with the present invention in combination with a slitter shear assembly and welding assembly of any known type;

FIGS. 2–6 are schematic diagrams showing progressively the various steps which are followed in the shearing and joining of strip ends using the strip clamp assembly and gap control mechanism of FIG. 1.

Figure 4:
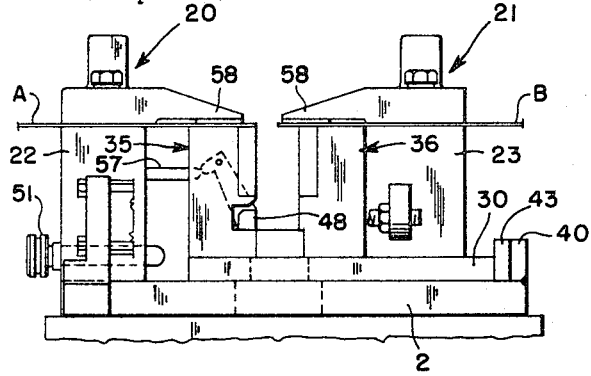

Turning first to the details of the preferred form of strip clamp assembly and gap control mechanism illustrated by way of example in FIGS. 1–6, such strip clamp assembly and gap control mechanism is generally indicated at 1, supported on a main frame 2 with a carriage 3 mounted overhead for moving a slitter shear assembly 4 and welding assembly 5 or the like transversely across a pair of strips A and B clamped by the strip clamp assembly 1. Suitable means such as a reversible electric motor 6 or hand crank 7 may be used for driving the carriage 3 back and forth along rails 8 and 9 supported above the main frame 2 by a pair of fixed supports 10 attached to the ends of the rails. The slitter shear assembly 4 and welding assembly 5 are shown carried between opposite ends of a pair of support arms 15 centrally pivoted to the carriage 3, with a hydraulic piston-cylinder assembly 16 interconnecting the carriage 3 and support arms 15 for lowering and raising the slitter shear assembly 4 and welding assembly 5 into and out of strip pass height. Thus as the slitter shear assembly 4 is swung into strip pass height, the welding assembly 5 is automatically retracted and vice versa. However, it should be understood that such slitter shear assembly 4 and welding assembly 5 could be mounted for independent operation if desired, either on the same carriage 3 or on separate carriages. Moreover, although the welding assembly 5 illustrated is in the form of a torch 17, is may be any type of welding assembly, such as a seam welding wheel, spot welding electrode, spot stitch equipment, gas welding apparatus, or flash butt welding apparatus, depending upon the type of weld desired. Alternatively, means could be provided for forming a mechanical joint between the strip ends, rather than a weld joint, without departing from the present invention.

The strip clamps 20, 21 for the strip clamping assembly and gap control mechanism 1 respectively include a platen 22, 23 and an elongated clamping beam 24, 25 mounted for vertical movement toward and away from their respective platens 22, 23 by a pair of piston-cylinder assemblies, only the rods 26 of which are shown. The platen 22 for the exit clamp 20 is preferably fixed to the main frame 2, while the platen 23 for the entry clamp 21 is mounted for limited sliding movement along a bed plate 30 toward and away from the stationary exit clamp 20. A pair of slideways 31 secured to the main frame 2 by suitable fasteners, one adjacent each end of the platen 23, guide the entry clamp 2 during its limited movement, and also guide the bed plate 30 during limited movement toward and away from the stationary clamp 20 as will be more fully explained hereafter.

Attached to the bed plate 30 inwardly of the movable platen 23 is a pair of laterally spaced lower shear block assemblies 35 and 36, each including an elongated backup block 37 and shear knife 38 between which the slitter shear blades 39 of the slitter shear assembly 4 are adapted to pass for cutting of the trailing and leading ends of the strips A and B parallel to each other when the slitter shear assembly 4 is lowered to strip shearing height and the lower shear block assemblies 35 and 36 are in the shear position illustrated in FIGS. 2 and 3 with the bed plate 30 engaging a fixed stop 40 on the main frame 2 and the movable platen 23 contacting a flange 43 on such bed plate.

In the shearing position, the clamping beams 24 and 25 substantially overhang their respective platens 22 and 23 closely adjacent the cutting edges of the shear knives 38 for firmly pressing the strips A and B against the lower shear block assemblies 35 and 36, and there is a slight space 41 between the movable platen 23 and adjacent lower shear block assembly 36, as well as a space 42 between the stationary platen 22 and lower shear block assembly 35. Accordingly, upon completion of the shearing operation, the movable strip clamp 21 may be indexed into engagement with the adjacent lower shear block assembly 36 through actuation of piston-cylinder assemblies 45 suitably attached to the main frame 2 adjacent either end of the stationary strip clamp 20 with their rods 46 connected to the movable platen 23 as at 47, during which the leading end of the new strip B is slid inwardly over the lower shear block assembly 36 to permit the same to be engaged and supported by a backup bar electrode 48 when swung into position between the lower shear block assemblies 35 and 36, in a manner to be subsequently explained. Continued actuation of the piston-cylinder assemblies 45 in the same direction will cause further indexing of the movable clamp 21 and strip B together with the bed plate 30 and lower shear block assemblies 35 and 36 fixed thereto toward the statonary strip clamp 20 until the bed plate 30 engages a stop screw 51 or the like projecting from the inner face 52 of the stationary platen 22.

Because the strip A is held stationary by the exit strip clamp 20 during such indexing of the lower shear block assemblies 35 and 36, there is relative sliding movement between the lower shear block assembly 35 and strip A which exposes the trailing end of the strip A also for engagement by the backup bar electrode 48. Moreover, since the stop screw 51 determines the total extent to which the movable clamp 21 with strip B may be indexed toward the stationary strip A, the gap between the strip ends may be accurately adjusted as desired without contacting either strip simply by rotatably adjusting the position of the stop screw 51 in opposite directions.

The backup bar electrode 48 is shown pivoted to the lower shear block assembly 35 at 55 and provided with a projection 56 which is adapted to be contacted by a fixed cam 57 projecting from the stationary platen 22 during such indexing of the lower shear block assembly 35 for automatic swinging of the backup bar electrode 48 into position firmly pressing the ends of the strips A and B against the noses 58 of the elongated clamping beams 24 and 25 just as the bed plate 30 abuts the adjustable stop screw 51.

Having thus described the details of the strip clamping assembly and gap control mechanism 1 of the present invention, its operation will now be set forth. Referring again to FIG. 2, the strip clamp assembly and gap control mechanism 1 is shown in the shearing position with the strip clamps 20 and 21 firmly gripping the strips A and B adjacent their respective trailing and leading ends which are to be cut off. Now the slitter shear assembly 4 is lowered to strip pass height and the carriage 3 caused to travel across the strips, making sure that the slitter guide shoe 60 (see FIG. 1) enters the spacing between the lower shear block assemblies 35 and 36 to align the slitter shear blades 39 with the lower shear knives 38 and to insure proper knife separation. As the carriage 3 traverses the strips A and B, the slitter shear blades 39 cut scrap material from the strips which falls through aligned openings 60, 61 in the bed plate 30 and main frame 2.

Figure 5:
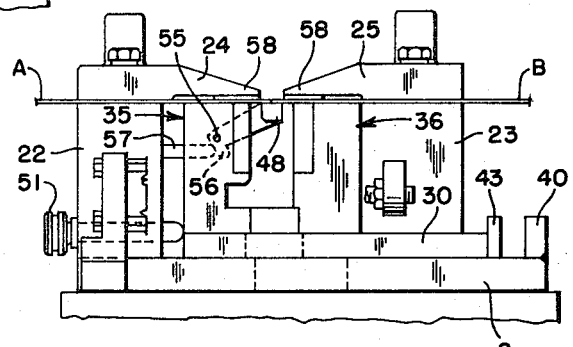
Figure 6:
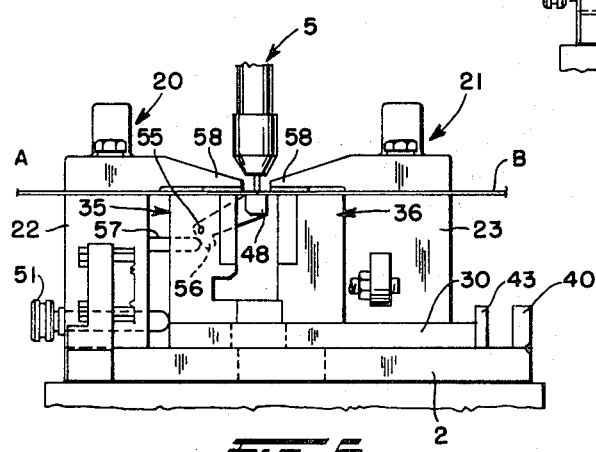

Now the piston-cylinder assemblies 45 are actuated first to cause indexing of the movable clamp 21 into engagement with the lower shear block assembly 36 to expose the leading end of the strip B and then to cause indexing of the movable clamp 21 and bed plate 30 with lower shear block assemblies 35 and 36 into engagement with the adjustable stop screw 51, during which the trailing end of the stationary strip A is likewise exposed and the desired gap between the strip ends is obtained. Also, as previously mentioned, the backup bar electrode 48 is automatically swung into position in engagement with the strip ends during the latter indexing of the bed plate 30. With the ends of the strips A and B now positioned as shown in FIGS. 5 and 6, the welding assembly 5 is lowered to the weld position during which the slitter shear assembly 4 is automatically raised, and the carriage 3 is caused to travel back across the strips to its original starting position, welding the strip ends together during the pass. Finally, the strip clamps 20 and 21 are opened to release the joined strips A and B for continued movement along a strip processing line or the like, during which various metal working operations may be performed thereon.

Although as described the movable clamp 21 is first brought into engagement with the lower shear block assembly 36 before there is any movement of the bed plate 30 with lower shear block assemblies 35 and 36 toward the adjustable stop screw 51, it should be understood that the order of such movements is not critical and may be varied without departing from the present invention. However, if desired a compression spring or the like (not shown) could be disposed between the stationary platen 22 and bed plate 30 to maintain the position of the lower shear block assembly 36 until after indexing of the movable clamp 21 into engagement therewith. The same remarks apply with regard to the return movement of the strip clamp 21 and bed plate 30 to their initial shearing position in engagement with the flange 43 and fixed stop 40, respectively, upon actuation of the piston-cylinder assemblies 45 in the opposite direction.

Figure 7:
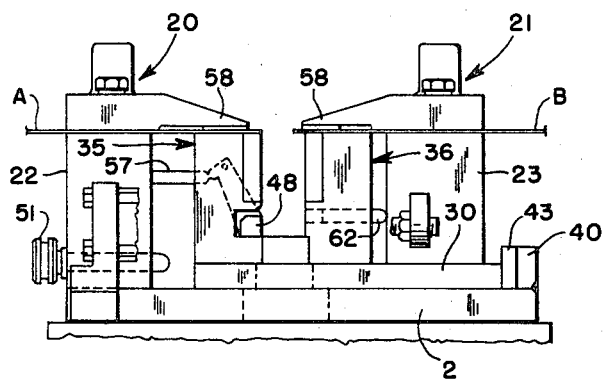
FIG. 7 is a schematic diagram of another form of strip clamp assembly and gap control mechanism in accordance with this invention.

Moreover, while in the preferred form shown in FIGS. 1–6, the amount of indexing of the movable strip B with respect to the lower shear block assembly 36 is determined by the spacing 41 between such lower shear block assembly 36 and the movable platen 23, it should be understood that an adjustable stop screw 62 or the like could also be provided either in the lower shear block assembly 36 as shown in the FIG. 7 embodiment or in the movable platen 23 for varying the amount of movement of the platen 23 toward the lower shear block assembly 36. Alternatively, a suitable shim of any desired thickness could be disposed between such lower shear block assembly 36 and movable platen 23 to vary the amount of spacing 45 therebetween. Otherwise, the structure and operation of the FIG. 7 embodiment is substantially identical to the FIGS. 1–6 form and, therefore, no further discussion of the same is thought to be necessary.

It can now be seen that the strip clamp assembly and gap control mechanism of the present invention is of a unique and simple construction which is capable of accurately adjusting the gap between a pair of strips to be joined, and without ever having to contact the strips. The operator may select gaps of different widths for different thicknesses and types of metal strips simply by rotating an adjustable stop screw in opposite directions. Moreover, only one of the strip clamps is mounted for horizontal movement, and once the strip ends are clamped, they are continuously gripped both during the shearing and joining operations so as to eliminate any possibility of strip misalignment. Further, a unique backup bar electrode is provided which is automatically swung into position as the movable strip clamp approaches the final welding position.

Other modes of applying the principles of the invention may be employed, change being made as regards the details described, provided the features stated in any of the following claims or the equivalent of such be employed.

We therefore, particularly point out and distinctly claim as our invention:

1. In combination, a strip clamp assembly and a pair of shear block assemblies, said strip clamp assembly comprising a frame, and first and second strip clamps supported by said frame, said pair of shear block assemblies being supported by said frame between said strip clamps for movement between a strip shearing position and a strip joining position, means mounting one of said strip clamps for movement toward the adjacent shear block assembly subsequent to shearing of the end of a strip clamped thereby to move the trimmed end of such strip inwardly of said adjacent shear block assembly for exposing such trimmed end of such strip prior to joining with another strip, and means mounting said one strip clamp and said pair of shear block assemblies for movement as a unit toward the other of said strip clamps to expose the trimmed end of such another strip clamp by said other strip clamp inwardly beyond the other of said shear block assemblies and bring such trimmed ends toward each other to establish a predetermined spacing therebetween.

2. The combination of claim 1 wherein said other strip clamp is fixed to said frame.

3. The combination of claim 2 further comprising fixed stop means for limiting the extent of movement of said one strip clamp and pair of shear block assemblies as a unit toward said other strip clamp and thus limiting the extent of movement of the strip gripped by said one strip clamp toward the strip gripped by said other strip clamp.

4. The combination of claim 3 wherein said stop means is adjustable for varying the extent of movement of said shear block assemblies toward said other strip clamp to vary the spacing between the strip ends.

5. The combination of claim 1 wherein said means mounting said one strip clamp and said pair of shear block assemblies for movement as aforesaid comprises a bed plate slidably mounted on said frame for movement toward and away from said other strip clamp, said shear block assemblies being fixed to said bed plate, and said one strip clamp being slidably mounted on said bed plate for movement toward and away from the adjacent shear block assembly.

6. The combination of claim 5 further comprising guide means on said frame for guiding the movements of said bed plate and one strip clamp.

7. The combination of claim 1 further comprising a weld backup bar pivoted to one of said shear block assemblies, and means for swinging said backup bar into engagement with the exposed ends of such strips between said shear block assemblies in response to movement of said shear block assemblies and said one strip clamp toward said other strip clamp as aforesaid.

8. The combination of claim 7 wherein said backup bar is pivoted to the shear block assembly adjacent said other strip clamp, and said means for swinging said backup bar into engagement with the exposed strip ends comprises a projection on said backup bar and a fixed cam means extending from said other strip clamp and adapted to engage said projection to effect such swinging movement of said backup bar during movement of said shear block assemblies and one strip clamp toward said other strip clamp as aforesaid.

9. In combination, a strip clamp assembly and gap control mechanism comprising a frame, a pair of strip clamps supported by said frame, a pair of shear block assemblies spaced a fixed distance apart, means mounting said pair of shear block assemblies for movement between said strip clamps from a strip shearing position to a strip joining position and return, means mounting one of said strip clamps for movement toward and away from the other of said strip clamps and the adjacent shear block assembly, said other strip clamp being fixed to said frame, and piston-cylinder means for effecting such movements of said one strip clamp and said shear block assemblies.

10. The combination of claim 9 further comprising means for limiting the extent of movement of said one strip clamp and pair of shear block assemblies toward said other strip clamp and thus limiting the extent of movement of the strip gripped by said one strip clamp toward the strip gripped by said other strip clamp.

11. The combination of claim 9 further comprising means for varying the extent of movement of said one strip clamp toward the adjacent shear block assembly subsequent to shearing of a strip gripped thereby to vary the amount of exposure of such trimmed strip end inwardly beyond the adjacent shear block assembly.

12. The combination of claim 9 wherein said strip clamps comprise a platen, an elongated clamping beam, and means mounting said clamping beam on said platen for vertical movement toward and away from said platen, said clamping beams being adapted to substantially overhang said platens by a distance sufficient to permit said clamping beams to press strips firmly against the adjacent shear block assemblies when said shear block assemblies and said one strip clamp are in the shearing position, said clamping beams and the trimmed strip ends overhanging said shear block assemblies when said shear block assemblies and said one strip clamp are in the strip joining position.

13. The combination of claim 10 wherein said means for limiting the extent of movement of said one strip clamp and pair of shear block assemblies toward said other strip clamp comprises an adjustable stop screw extending from said other strip clamp toward the adjacent shear block assembly.

References Cited
UNITED STATES PATENTS 2,782,488   2/1957   Anderson _____ 228—13

RICHARD H. EANES, JR., *Primary Examiner.*